United States Patent [19]

Orawiec

[11] 4,126,232

[45] Nov. 21, 1978

[54] ELECTRICAL SWITCHBOARD APPARATUS WITH INTEGRAL TRAVELING LIFTING MECHANISM

[75] Inventor: Thomas M. Orawiec, Florissant, Mo.

[73] Assignee: Westinghouse Electric Corp., Pittsburgh, Pa.

[21] Appl. No.: 802,929

[22] Filed: Jun. 2, 1977

[51] Int. Cl.² .............................................. B66C 17/06
[52] U.S. Cl. .................................. 212/11; 200/150 R
[58] Field of Search ..................................... 212/10–14, 212/18; 200/150 R, 150 JA; 280/766

[56] References Cited

U.S. PATENT DOCUMENTS

| 1,390,036 | 9/1921 | Jacobs ............................ 200/150 JA |
| 2,276,653 | 3/1942 | Hayford et al. ................ 200/150 JA |
| 2,499,625 | 3/1950 | Block ................................... 280/766 |
| 2,932,413 | 4/1960 | Chanut et al. ......................... 212/11 |
| 3,214,959 | 11/1965 | Bowden ................................. 212/11 |
| 3,384,360 | 5/1968 | Piltvzak ................................. 212/11 |

FOREIGN PATENT DOCUMENTS 403,226  6/1966  Switzerland ............................... 212/10

*Primary Examiner*—Lawrence J. Oresky
*Attorney, Agent, or Firm*—Robert E. Converse, Jr.

[57] ABSTRACT

Electrical switchboard apparatus includes a switchboard having a plurality of cells adapted to receive circuit interrupters and related electrical equipment, a weatherproof housing enclosing the switchboard and providing a maintenance area between the front of the switchboard face and the interior front wall of the enclosure, and a traveling lifting mechanism movably supported at the top of the maintenance area upon two parallel rails extending across the switchboard face and the interior front wall of the enclosure. The lifting mechanism is a bridge-type crane comprising a perimeter frame of U-shaped steel channel members and a flanged steel plate bolted thereto. The lifting mechanism also includes a winch and a pulley supporting a lifting cable attached to the winch. The pulley is supported upon a steel pin removably inserted into any of a series of holes in angled support members mounted within the perimeter frame. The movable pulley provides lifting points at various distances from the face of the switchboard to accommodate a variety of breakers sizes. The lifting mechanism presents a low profile allowing it to be completely enclosed by the housing while still enabling the entire apparatus to be transported on standard flatbed trucks.

6 Claims, 7 Drawing Figures

ELECTRICAL SWITCHBOARD APPARATUS WITH INTEGRAL TRAVELING LIFTING MECHANISM

BACKGROUND OF THE INVENTION

1. Field of the Invention

The invention relates generally to electrical apparatus and, more particularly, to enclosed switchboards having an integral lifting mechanism.

2. Description of the Prior Art

Switchboards are widely used in the distribution of electrical power from incoming utility company feeder lines to electrical loads distributed throughout a building or other facility. A plurality of circuit breakers are removably mounted one above the other within cells in the switchboard. Since circuit breakers are large and heavy, weighing up to 500 pounds, means must be provided to lift the circuit breakers to the proper height for insertion into their respective cells. For switchboards to be situated inside a building, forklift trucks, cranes, or other lifting apparatus may be used. However, switchboards to be located outdoors must be enclosed in a weatherproof housing, making it difficult or impossible to use conventional outboard lifting equipment to properly position the circuit breakers in their cells.

In the past, enclosed switchboards have employed special lifting mechanisms removably mounted upon the exterior of the housing or mounted within the housing on top of the switchboard. Prior art lifting mechanisms mounted on the outside of the enclosure would be exposed to weather if left in place continuously. Therefore, it was necessary to provide storage space for the lifting mechanisms and means to lift and mount the mechanism into proper position when it was desired to use it. This was often inconvenient and impractical.

Since electrical switchboards are constructed at a standard height of 90 inches, lifting mechanisms mounted on top of the switchboard within the enclosure required the enclosure to be larger than normal in order to provide proper clearance for the lifting mechanism between the top of the switchboard and the ceiling of the enclosure. Shipment of some prior art enclosed switchboards thus required a special low-boy truck for motor freight delivery. This resulted in an additional transportation charge ranging as high as several thousand dollars on long distance motor freight shipments.

It is therefore desirable to provide an enclosed electrical switchboard having a compact lightweight lifting mechanism which can remain permanently in its operating position within the enclosure while minimizing the total height of the enclosure to permit shipment on standard flatbed trucks.

SUMMARY OF THE INVENTION

In accordance with a preferred embodiment of the present invention there is provided electrical switchboard apparatus comprising an electrical switchboard, a weatherproof housing enclosing the switchboard, and a traveling lifting mechanism movably supported upon parallel rails mounted across the top of the switchboard face and an interior front wall of the enclosure.

The lifting mechanism is a bridge-type crane comprising a perimeter frame of U-shaped steel channel members. A flanged flat plate is bolted to the frame to provide extra strength and rigidity. The frame is supported at its perimeter by a plurality of steel wheels rotating about horizontal axes to allow the lifting mechanism to be rolled horizontally along the support rails. A plurality of steel wheels rotating about vertical axes may be provided to bear against the edges of the support rails to provide lateral stability. A movable pulley is provided which is supported within the interior of the frame upon a steel pin. A winch mounted upon the mechanism provides a cable which runs horizontally across the frame to the pulley to provide a lifting point for circuit interrupting apparatus to be positioned. The pulley axle is interchangeably mounted in a series of holes to provide lifting points at a variety of horizontal distances from the front of the switchboard.

BRIEF DESCRIPTION OF THE DRAWINGS

The invention may be more readily understood from the following specification, taken in conjunction with the drawings, in which.

DESCRIPTION OF THE PREFERRED EMBODIMENT

Figure 1:
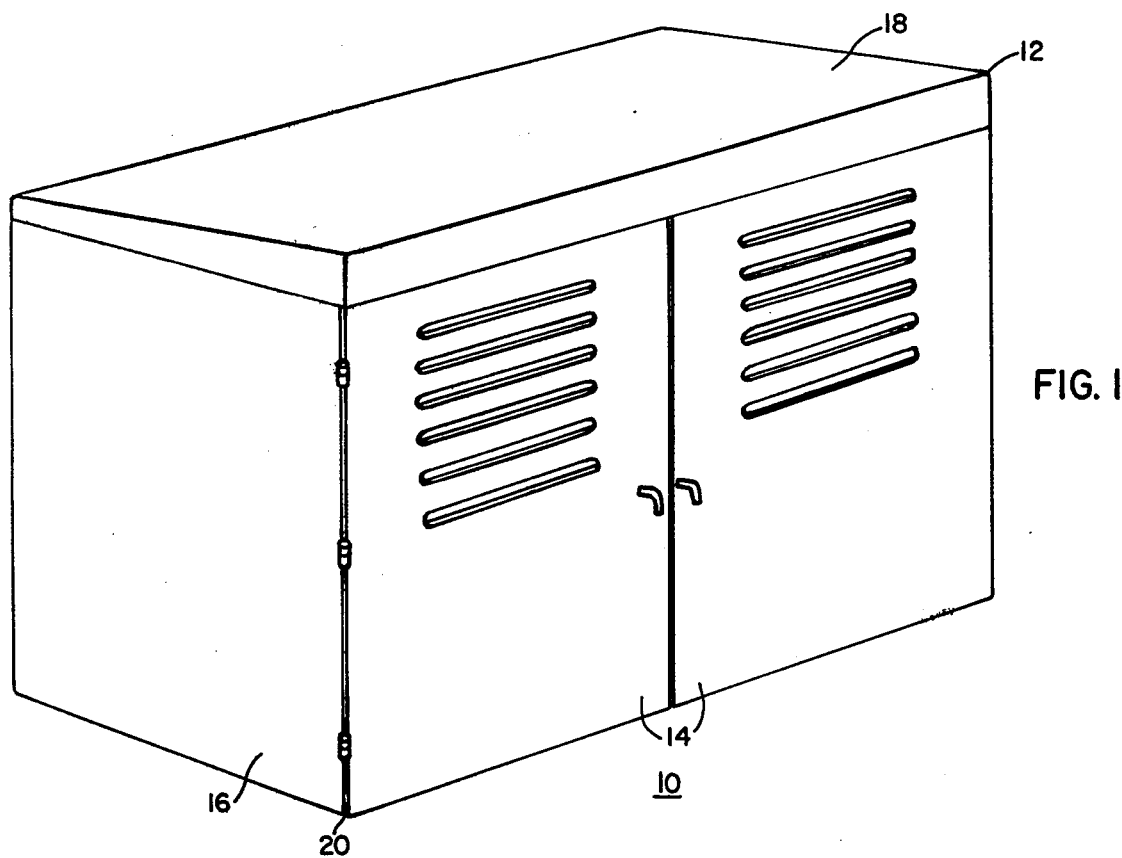
FIG. 1 is a perspective view of an electrical switchboard enclosed in a weatherproof housing.
Figure 2:
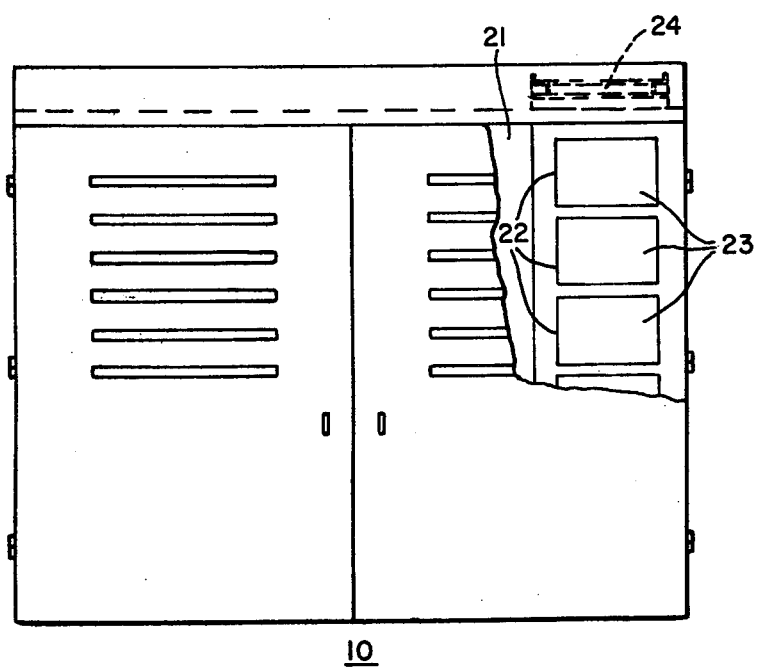
FIG. 2 is a front elevational view of the housing shown in FIG. 1 with one door partially cut away to show the relationship of a lifting mechanism to the housing.

Referring now to the drawings, in which like reference characters refer to corresponding elements, FIG. 1 shows a perspective view of an enclosed electrical switchboard 10 incorporating the principles of the present invention. A weatherproof housing 12 comprises a pair of doors 14, side panels 16, and a sloping roof panel 18 bolted to a steel structural support frame 20.

An electrical switchboard 21 is located within the interior of the housing 12 and includes a plurality of cells 22 adapted to receive electrical equipment such as circuit breakers 23. A lifting mechanism 24 is supported for horizontal movement back and forth across the face of the switchboard 21 upon front and rear support rails 26 and 28 mounted at the top of the inside front surface of the housing 12 and the face of the switchboard 21, respectively. The U-shaped support rail 26 is reinforced by an angle member 27 to eliminate any deflection in the rail. The assembly is then bolted to a horizontal structural frame member just behind the doors 14 of the housing 12.

Referring now to FIGS. 4, 5, 6 and 7, it can be seen that the lifting mechanism 24 comprises a perimeter frame 29 of steel U-shaped channel members 30 and 32 bolted together to form a rectangle. A flanged steel plate 34 is bolted to the frame 29 to provide extra strength and rigidity. A winch 36 comprising a reel 38 and a reducing gear mechanism 40 are supported upon front and rear mounting plates 41 bolted to a channel member 30. Bolted between the channel members 32 is a support member 42 of Z-shaped cross section which in turn helps to support a pair of angled pulley support members 44. A plurality of holes 45, 46, 47 are adapted to interchangeably receive a steel pin, or axle, 48 which supports a pulley 50. Steel cable 52 wound upon the reel 38 is horizontally threaded over the pulley 50 and is attached at its end to a lifting bracket 53, which is adapted for attachment to a circuit breaker.

The lifting mechanism 24 includes four steel wheels 54 mounted at the corners of the perimeter frame 29 for rotation about horizontal axes. The wheels 54 are spaced to ride in the support rails 26 and 28 to allow the lifting mechanism 24 to be rolled horizontally back and forth across the face of the switchboard 21. A plurality of wheels 56 may be mounted to the frame 29 for rotation about vertical axes to engage the sides of the support rails 26 and 28, thereby providing lateral stability and preventing binding of the lifting mechanism 24 as it is rolled from one side to another within the rails 26 and 28.

Figure 3:
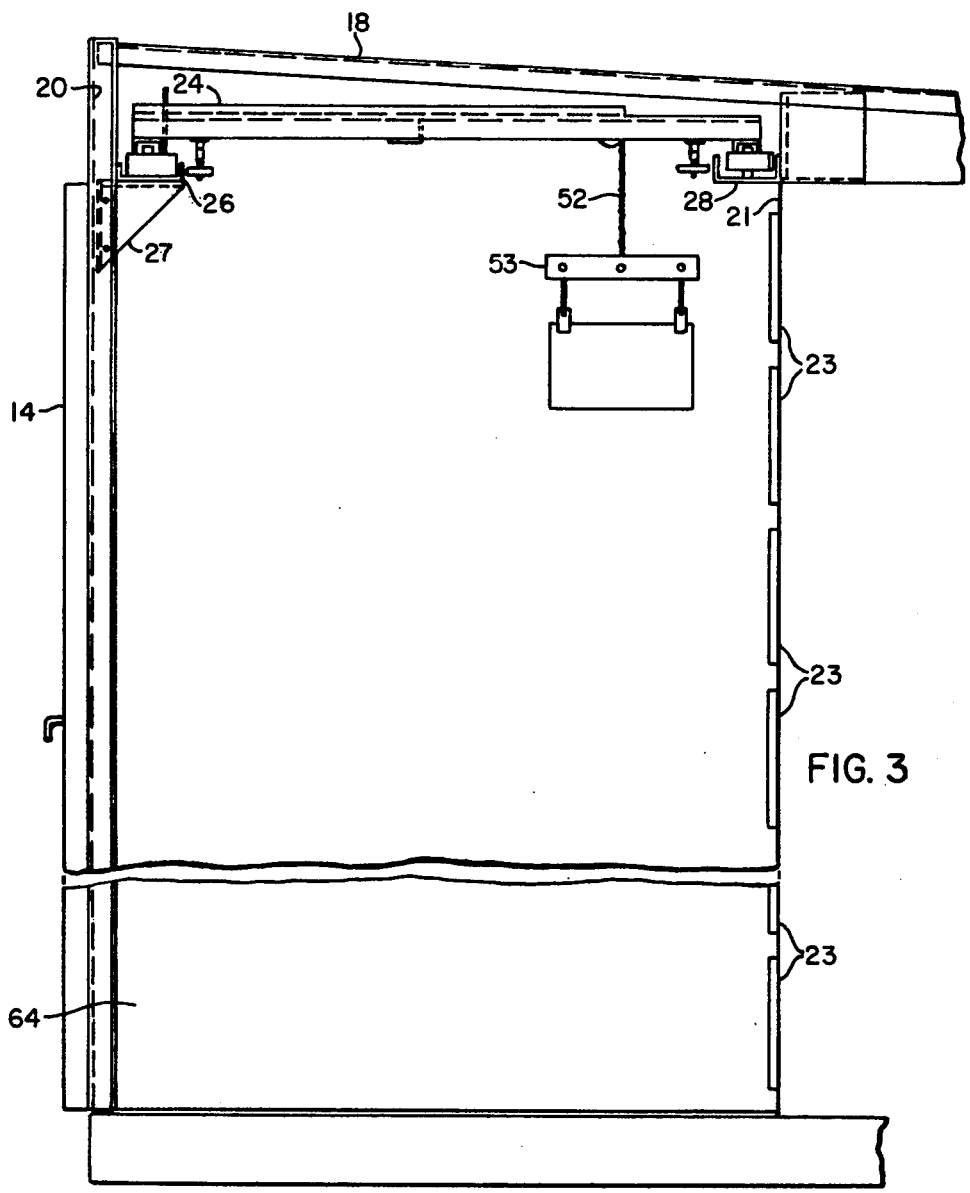
FIG. 3 is a partial side view of the enclosed switchboard of FIGS. 1 and 2 with one side panel removed to show a maintenance area between the face of the switchboard and the interior front wall of the enclosures.
Figure 4:
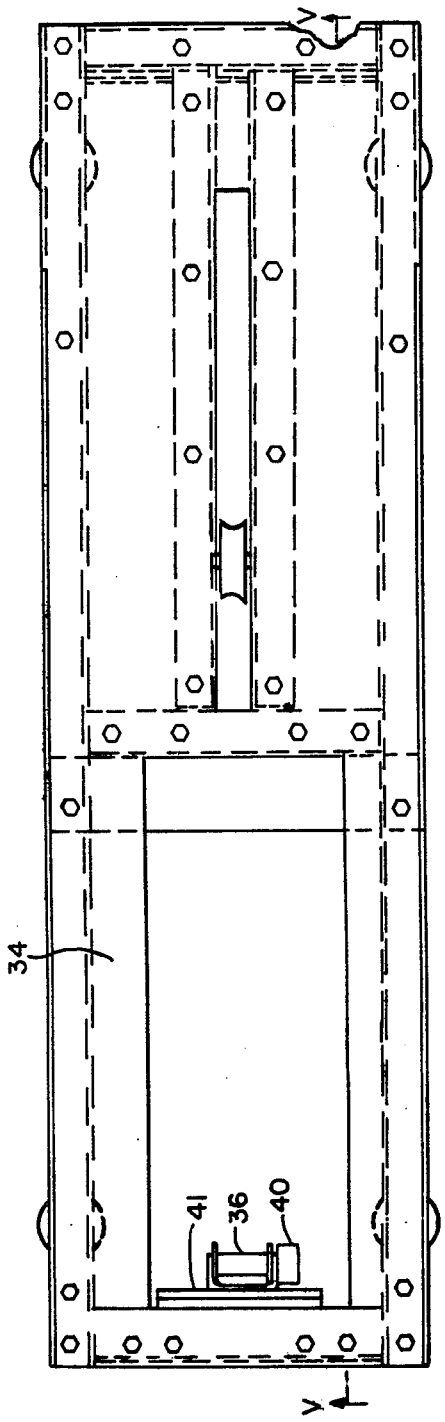
FIG. 4 is a top view of the lifting mechanism shown in FIGS. 2 and 3.
Figure 6:
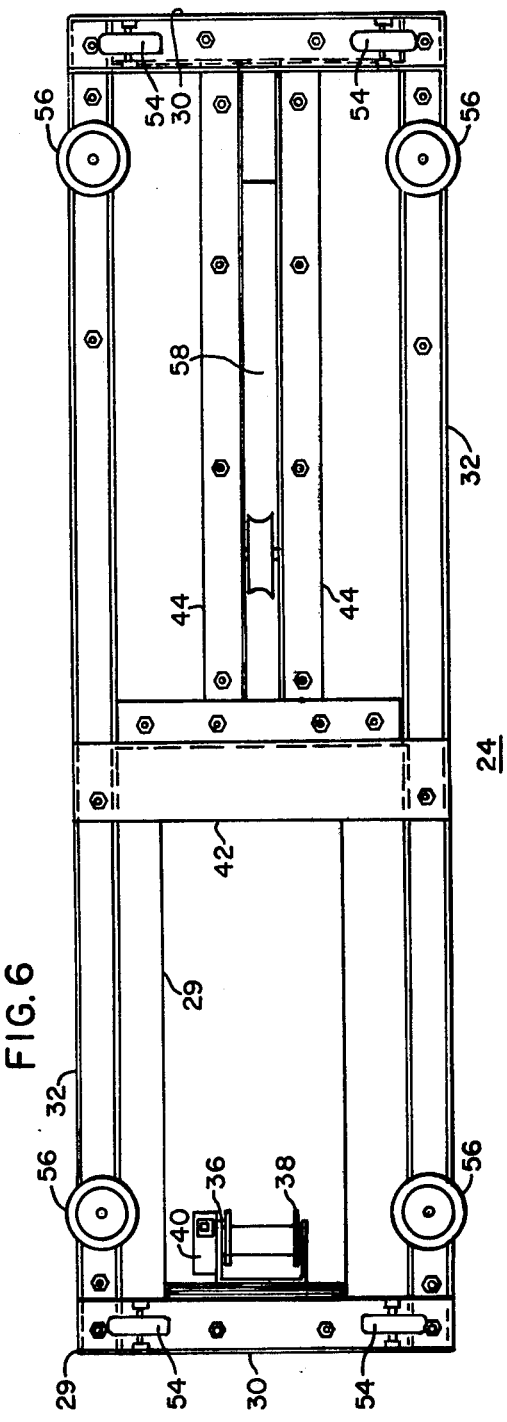
FIG. 6 is a bottom view of the lifting mechanism.
Figure 7:
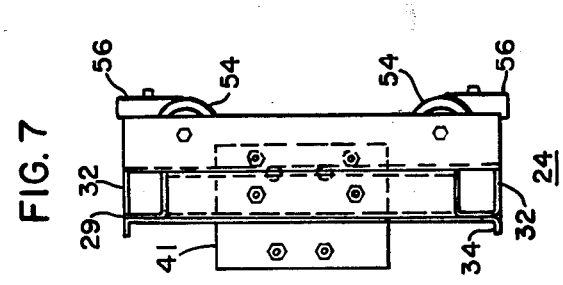
FIG. 7 is an end view of the lifting mechanism.
Figure 5:
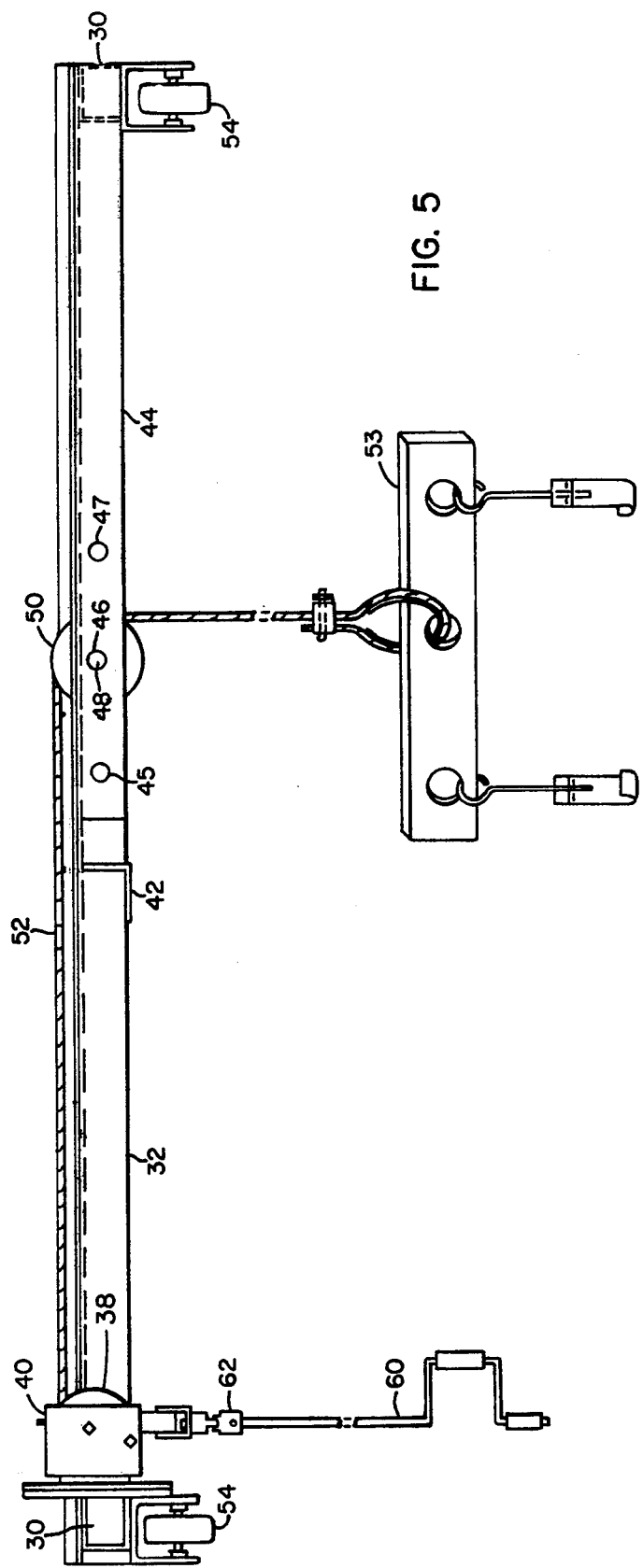
FIG. 5 is a side view of the lifting mechanism looking in the direction of arrow V—V of FIG. 4.

As can be seen most clearly in FIG. 3 and FIG. 6, the cable 52 hangs vertically through a small aperture 58 in the plate 34 and is attached through the bracket 53 to a circuit breaker. An operating crank 60 having a universal joint 62 engages the reducing gear mechanism 40 to operate the winch 36 to reel in the cable and lift the circuit breaker to its proper level for insertion into the mounting cell.

Since circuit breakers are available in various frame sizes it can be seen that, for most convenient lifting, the distance from the front face of the switchboard 21 to the lifting point must be variable. The present invention provides this variety of lifting point distances by providing multiple mounting points for the pulley 50. For maximum separation distance, the steel pulley support pin 48 is inserted in the hole 45, providing convenience in lifting and insertion of the largest circuit breaker frame size. For the smallest frame size, the pin 48 is inserted into the hole 47, thereby providing the minimum separation distance between the face of the switchboard 21 and the lifting point to allow for convenient handling of the smallest circuit breaker frame size.

The mechanism 24 may be operated by personnel standing in the maintenance area 64 between the face of the switchboard and the enclosure doors. However, the use of a crank having a universal joint 62 allows the operator to stand completely outside of the housing 12 and operate the lifting mechanism, a flexibility which is particularly useful during the handling of the largest circuit breaker frame sizes which require one person to operate the lifting mechanism and one or two other people to insert the breaker into its cell once it is lifted to its proper height.

As can be seen, the lifting mechanism 24 has a very low profile from top to bottom, requiring a minimum of clearance below the roof 18. Thus, the overall height of the housing 12 is minimized. For example, using a standard switchboard 90 inches in height, a weatherproof housing 103 inches high can provide adequate clearance for the lifting mechanism 24 and still be shipped upon standard flatbed trucks. This provides a very significant saving in shipment cost over prior art enclosed electrical switchboard apparatus which required the use of a special low-boy truck to conform to overall highway height restrictions.

The present invention provides electrical switchboard apparatus having a lifting mechanism which is light in weight yet has sufficient strength to lift extremely large circuit breakers. For example, a lifting mechanism constructed of components as indicated in Table I weighs only 58 pounds, yet is capable of lifting circuit breakers weighing up to 523 pounds.

TABLE I

| Reference No. | Description |
|---|---|
| 30 | 10 gauge channel steel 1.25" × 1.25" × 12.75" |
| 32 | 10 gauge channel steel 1.25" × 1.25" × 38.12" |
| 34 | 10 gauge plate steel 15.25" × 38.12" |
| 36 | 1000 pound capacity winch |
| 37 | 5/32" steel cable 2300 pound capacity |

It can be seen therefore that the present invention provides enclosed electrical switchboard apparatus having a standard height switchboard and a compact, lightweight lifting mechanism which can be enclosed in a weatherproof housing of minimum height, thereby providing a significant advantage over the prior art.

I claim:

1. Transportable electrical switchboard apparatus, comprising:
   a switchboard comprising a plurality of cells arranged over the face of said switchboard and adapted to receive a horizontally insertable circuit interrupter;
   a transportable enclosure disposed around said switchboard and defining a maintenance area between the front of said cells and an interior wall of said enclosure;
   a first support rail horizontally mounted upon said switchboard and parallel to the frontal surface of said cells;
   a second support rail horizontally mounted across the inner surface of said enclosure interior wall and parallel to said first support rail; and
   a lifting mechanism disposed within said enclosure comprising:
   a horizontal perimeter frame,
   a plurality of movable frame support members mounted upon said frame and positioned to rest upon said first and second support rails,
   a winch,
   a cable attached to said winch, and
   a rotatable cable support member mounted upon said frame and located between said first and second support rails, whereby said cable hangs between said support rails, whereby said enclosure, said lifting means and said switchboard are transportable as a unit.

2. Apparatus is recited in claim 1 wherein said movable frame support members comprise wheels rotatable about a horizontal axis.

3. Apparatus as recited in claim 1 wherein said cable support member comprises a pulley and an axle movable between a variety of mounting positions at different horizontal distances perpendicular to the switchboard face.

4. Apparatus as recited in claim 3 wherein said support rails comprise a horizontal surface supporting said frame support members and a vertical surface, said lifting mechanism further comprising guide members cooperating with said vertical surfaces for aligning said lifting mechanism during movement thereof along said support rails.

5. Apparatus as recited in claim 4 wherein said guide members comprise wheels mounted upon said frame and rotatable about a vertical axis.

6. Apparatus as recited in claim 1, wherein said rotatable cable support member comprises a pulley and an axle, and said frame comprises means defining a plurality of support positions for said axle whereby said cable can support circuit interrupters at a variety of distances from the frontal surface of said cells.

* * * * *